(No Model.) 3 Sheets—Sheet 1.

E. E. MARSHALL.
PLANTER AND FERTILIZER DISTRIBUTER.

No. 395,287. Patented Dec. 25, 1888.

Witnesses:

Inventor:
Eugene Ellis Marshall,
by his Attorney (No Model.) 3 Sheets—Sheet 2.
E. E. MARSHALL.
PLANTER AND FERTILIZER DISTRIBUTER.
No. 395,287. Patented Dec. 25, 1888.
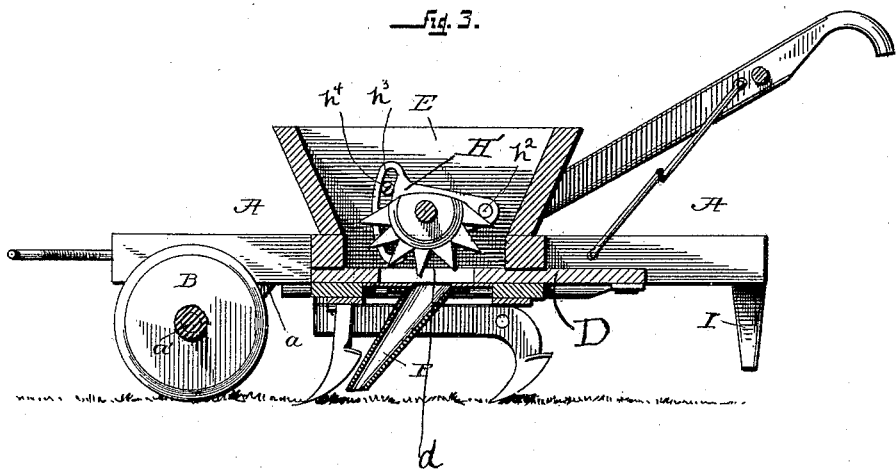
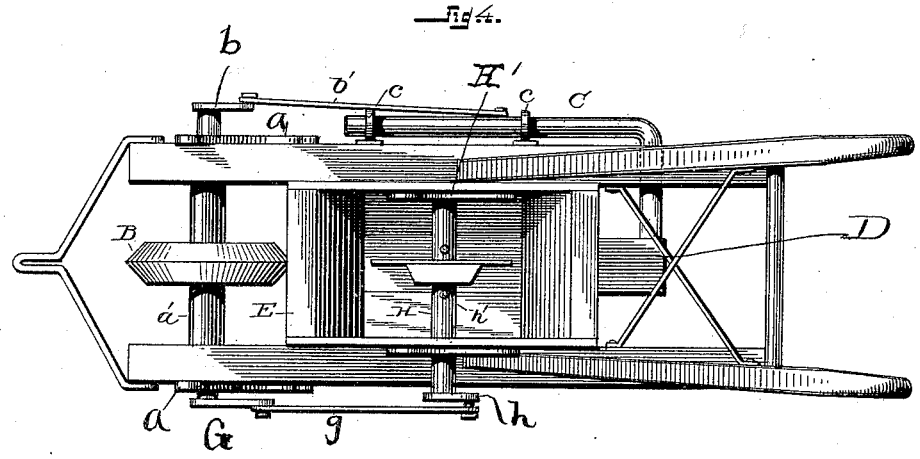
Witnesses.
Inventor:
Eugene Ellis Marshall,
by A. L. Dyrenforth,
his Attorney.

(No Model.) 3 Sheets—Sheet 3.
E. E. MARSHALL.
PLANTER AND FERTILIZER DISTRIBUTER.
No. 395,287. Patented Dec. 25, 1888.
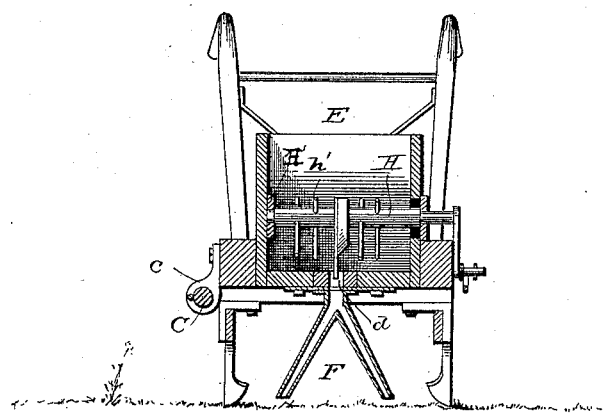
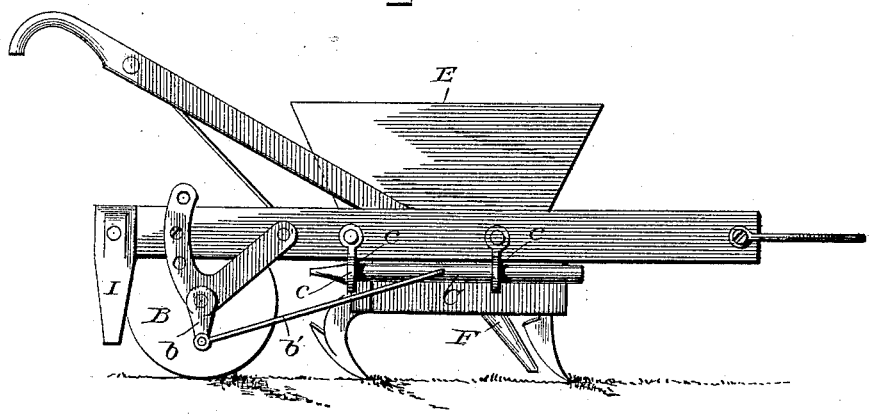

UNITED STATES PATENT OFFICE.

EUGENE ELLIS MARSHALL, OF LOUISBURG, NORTH CAROLINA, ASSIGNOR OF TWO-THIRDS TO J. K. SPENCER AND ARTHUR ARRINGTON, BOTH OF SAME PLACE.

PLANTER AND FERTILIZER-DISTRIBUTER.

SPECIFICATION forming part of Letters Patent No. 395,287, dated December 25, 1888.

Application filed May 5, 1888. Serial No. 272,959. (No model.)

*To all whom it may concern:*

Be it known that I, EUGENE ELLIS MARSHALL, a citizen of the United States, residing at Louisburg, in the county of Franklin and State of North Carolina, have invented certain new and useful Improvements in Planters and Fertilizer-Distributers; and I do hereby declare the following to be a full, clear, and exact description of the invention, such as will enable others skilled in the art to which it appertains to make and use the same.

This invention relates to planters and fertilizer-distributers.

The object is to increase the efficiency, render more certain the action, and greatly simplify the construction of planters and distributers; produce a simple, durable, and comparatively inexpensive machine of light weight and easy draft; produce a machine which may be used as a dropper or driller of seeds by hand or horse power, or as a planter by horse-power alone; produce a machine which will drop, cover, and roll the seeds at one operation, and, finally, produce a machine which will distribute fertilizer, either manipulated or composited, opening the furrows for its reception, and then turning or listing it in.

The invention resides in the novel construction of the stirrer-shaft, the means for mounting and adjusting the same, and the devices for operating it, substantially as herein set forth and claimed.

Figure 1:
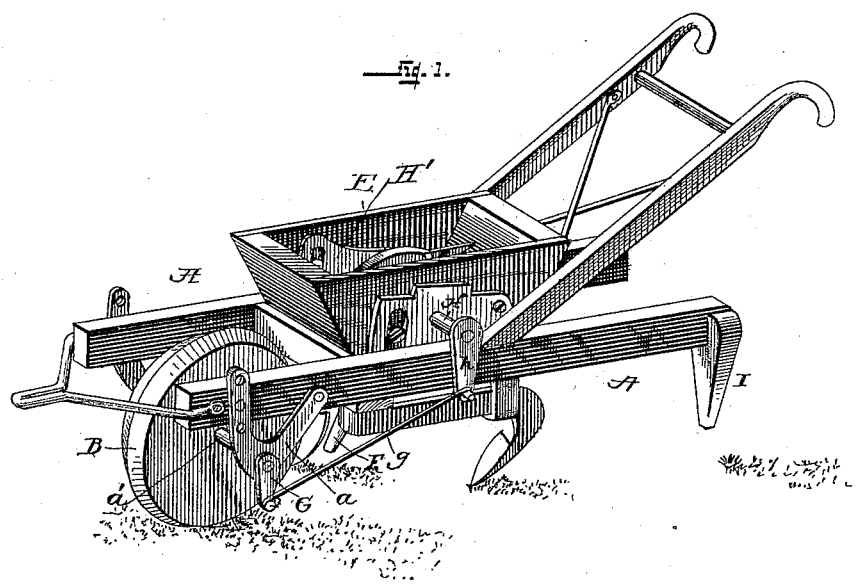
Figure 2:
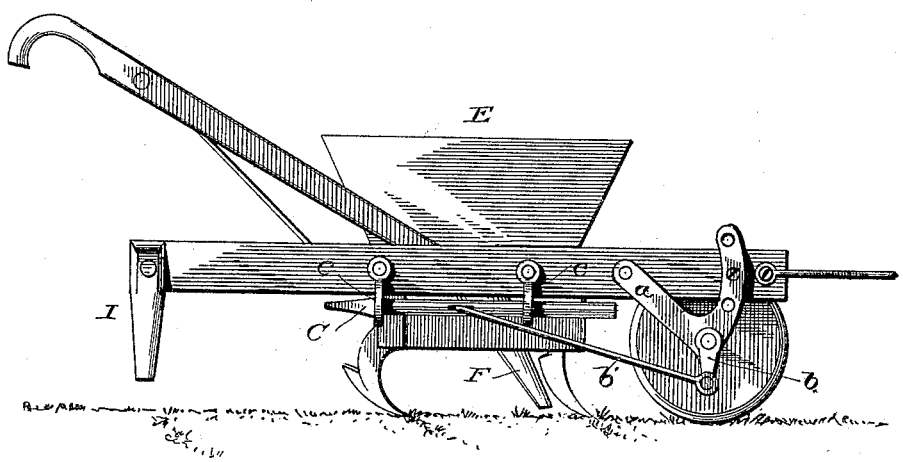

In the accompanying drawings, forming part of the specification, and in which like letters of reference indicate corresponding parts, Figure 1 is a perspective view showing the mechanism for operating the stirring device. Fig. 2 is a side elevation taken on the side opposite to that of Fig. 1, showing the slide-rod mounted on the frame and the rod for connecting the slide-rod with the crank on the shaft of the traction-wheel. Fig. 3 is a vertical sectional view showing the inner construction of the hopper, but more particularly the shaft carrying the stirrers and the half-circular-saw device for preventing the substance to be fed from becoming clogged in the discharge-spout. Fig. 4 is a plan view of the planter. Fig. 5 is a transverse section of a modified form of delivering-tube for conducting the seed. Fig. 6 is a side elevation showing the parts adjusted to bring the rollers behind instead of in front, as ordinarily.

Referring to the drawings, A designates the frame of the apparatus, which is made preferably of wood, and is suitably braced and strengthened by rods and cross-braces. On the outer end of this frame are two adjustable hangers, $a$, in which is mounted a shaft, $a'$, carrying a traction-wheel, B, which is designed to operate both the planting and stirring mechanism in the following manner: A crank, $b$, is secured to one end of the shaft $a'$, and to this crank is attached a rod, $b'$, which passes to and connects with a slide-rod, C, moving in guides or ways $c$ on the frame. The rear end of this slide-rod is bent or curved laterally at right angles to the portion that works in the guides, and to the end of the curved portion is secured a slide, D, which, when operated by the movement of the rod, slides back and forth underneath and serves to scatter suitable substance placed in the hopper E. The opening $d$ in the slide, through which the substance escapes, may be enlarged or diminished, as desired, the size of the opening regulating the amount discharged. Immediately below this opening is placed a discharge-spout, F, by means of which the substance is dropped into the hills. Instead of this discharge-spout, the branched one shown in Fig. 5 may be substituted, and thus two hills of seed may be planted simultaneously. On the other end of the shaft $a'$ is secured another crank, G, and to this is attached a rod, $g$, which is connected with a crank, $h$, on the stirrer-shaft H. On this shaft are fingers or stirrers $h'$, which are designed to agitate the substance placed in the hopper to keep it loose and prevent packing. Between these stirrers is secured a half-circular-saw device, which oscillates in the opening in the bottom of the hopper and prevents the grain or fertilizer from clogging when the mechanism is operating.

The stirrer-shaft is mounted at each end on pivoted arms or brackets H', which are attached to the sides of the hopper by suitable pins, $h^2$, and are provided at the opposite end with an elongated slot, $h^3$, in which is a set-screw, $h^4$, entering the side of the hopper. The shaft H being mounted at the center of this arm H', it is clear that by adjusting the movable end of the arm and retaining it in any desired position by means of the set-screw the opening in the bottom of the hopper through which the substance is distributed may be regulated at will.

When this device is used as a hand-planter, the operator uses the handles I, which will enable him to keep the shovels J from coming in contact with the ground, the traction-wheel serving both as a support for the front portion and also to move the various parts of the mechanism, as before described. When it is used as a horse-power planter, the traction-wheel may be removed and a roller be substituted, serving to operate the mechanism in the same manner as the traction-wheel. In this case a horse is hitched to the clevis on the front of the frame, and the apparatus will open the furrows, drop the seed, cover or list the furrows, and then roll the earth down by means of a roller at the rear. If desired, the flow of the fertilizer may be stopped in passing over ditches or when turning at the ends of rows by means of a leather flap with a weight attached to the bottom of the hopper and drawn over the hole by a string reaching back to the handles.

Having thus fully described my invention, what I claim as new, and desire to secure by Letters Patent, is—

1. The combination, in a planter and fertilizer-distributer, of the stirrer-shaft provided with fingers, arms pivoted to the sides of the hopper, receiving the ends of the stirrer-shaft, and provided with the elongated slots, and the set-screws projecting through the slots and entering the sides of the hopper, and means, substantially as described, for imparting motion to the stirrer-shaft.

2. The combination, in a planter and fertilizer-distributer, of the hopper, the stirrer-shaft mounted therein and provided with fingers, the arms pivoted to the sides of the hopper, receiving the ends of the stirrer-shaft, and having the elongated slots, the set-screws projecting through the slots and entering the sides of the hopper, and the traction-wheel connected with the stirrer-shaft, whereby motion is transmitted from the traction-wheel to the stirrer-shaft, substantially as described.

In testimony whereof I affix my signature in presence of two witnesses.

EUGENE ELLIS MARSHALL.

Witnesses:
O. H. HARRIS,
W. H. FURMAN, Jr.